Jan. 10, 1961     R. BOSTELMANN     2,967,741
MACHINE TOOLS, PARTICULARLY GRINDING MACHINES
Filed Jan. 29, 1958
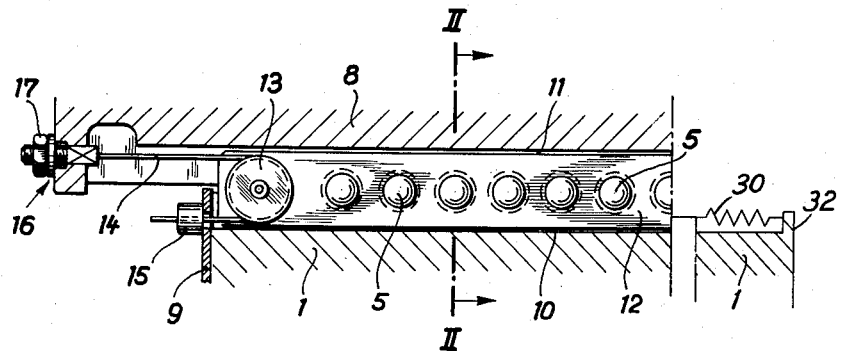
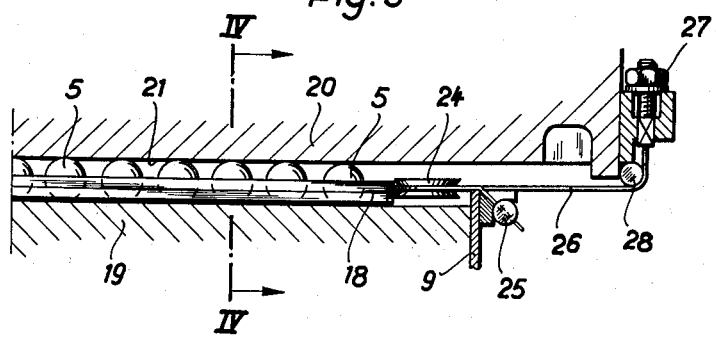
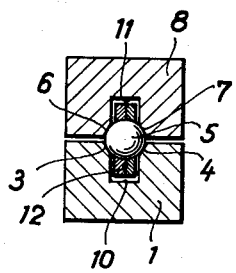 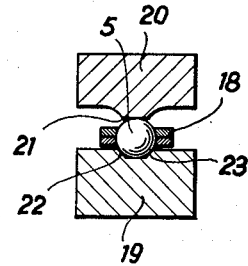
INVENTOR
RICHARD BOSTELMANN United States Patent Office 2,967,741
Patented Jan. 10, 1961

2,967,741

MACHINE TOOLS, PARTICULARLY GRINDING MACHINES

Richard Bostelmann, Hamburg-Bergedorf, Germany, assignor to Robert Blohm, Hamburg-Bergedorf, Germany Filed Jan. 29, 1958, Ser. No. 711,888

Claims priority, application Germany Sept. 14, 1957

3 Claims. (Cl. 308—6)

The invention relates to machine tools, particularly grinding machines, in which a movable part is supported upon roller bodies guided in a cage.

It is known, for example, to guide a carriage of a turret in a lathe on two rows of balls, wherein the balls are held in a cage and run in V-shaped longitudinal grooves. A corresponding guide is of advantage in grinding machines. The arrangement of the roller bodies has the advantage of a very ready movability of the carriage, whereby great operating accuracies are achieved.

In known constructions, the length of the roller body cage is such that the shifting movement thereof is limited by abutments corresponding to the greatest travel of the table or support. If small movements are made, the cage moves with the balls without any guiding. It has been found that the cage thereby takes up a random position. If further large advances must then be made, the cage is brought violently into its original position, for example by means of one of the abutments, whereby the balls and running surfaces become damaged.

The random disposition of the carriage given in known arrangements is attributable in part to the fact that, at the beginning of an operation, higher sliding resistances are to be overcome because of sliding friction and the lubricating agent present, so that an arbitrary movement of the cage is caused and the above-described disadvantages occur.

The invention avoids these disadvantages by a constrained guiding of the roller body cage along an extent given by the travel of the movable part with rolling friction of the roller bodies. The cage thus moves in small distances, so that the correct setting is given and no return with rubbing of the spheres into the running surfaces can occur.

According to a particularly preferred embodiment, the movement of the roller body cage is controlled in dependence upon the travel of the moving part. The invention provides such a control in one embodiment by means of a rod connected to the moving part and/or the support. According to a particularly preferred embodiment of the invention, a cable guide engaging the cage preferably at both ends is provided.

According to the invention, the rolling surface of the guide for the roller bodies, particularly of a prismatic guide for spherical roller bodies is so dimensioned with respect to the sphere diameter that the spheres with respect to the stroke of the movable part roll over a distance which corresponds to the guided stroke of the cage, which in turn depends upon the chosen or predetermined transmission ratio.

In using a cable guide, in a particularly preferred embodiment of the invention, the running surface is so arranged in the guide that the spheres move half the travel of the table, wherein the table is secured by one end to the support and by the other end to the movable part and is guided to the cage over a roller.

Further advantages and features of the invention appear from the following description of one embodiment which is illustrated in the accompanying drawings, in which:

Fig. 1 shows a partial view of a vertically arranged sphere cage between a support plate and a table plate of a machine-tool, partly in section;

Fig. 2 shows a section along the line II—II of Fig. 1;

Fig. 3 shows a partial view of a horizontally arranged sphere cage between a support plate and the table plate of a machine-tool, partly in section;

Fig. 4 shows a section along the line IV—IV of Fig. 3.

In Figs. 1 and 2, the support plate arranged in the frame of the machine is indicated at 1. This support plate is constructed with prism-shaped running surfaces 3, 4 for balls 5. Corresponding running surfaces 6, 7 are located in a table plate 8 which carries the movable part of the machine. Both the table plate 8 and the support plate 1 are further provided between the running surfaces 3, 4 and 6, 7 with grooves 10, 11, into which the cage 12 for the balls 5 projects. The grooves 10, 11 are so dimensioned in relation to the cage 12 that the cage 12 runs freely in the grooves 10, 11 if the running surfaces 3, 4 and 6, 7 are supported on the balls 5. The form of guide illustrated prevents lateral movement of the movable parts or of the table plate 8, since as a result of the inclination of the running grooves 3, 4 and 6, 7 lateral forces can be taken up.

At the end of the support plate 1, an abutment 9 is arranged which prevents overrunning of the cage 12 from the guide in the support plate 1.

A cable roller 13 is freely rotatably mounted at the end of the cage 12. A cable 14 is guided over this cable roller and its one end is secured to the abutment 9 or a securing nipple 15 behind this abutment, whereas its other end is secured at 16 for example by means of a nut 17 on the end of the table plate 8 projecting over the support plate 1.

The arrangement is such that the cage 12, in one end position of the table plate 8, is drawn tightly up against position of the abutment 9 or in front of this abutment by the cable 14.

If a cable roller is arranged at the other end of the cage 12 in the same way, over which runs a corresponding cable which is secured to the support plate 1 and the table plate 8, a constrained guiding of the cage 12 in dependence upon the movements of the table plate 8 is obtained. Because of the flexing of the cable 14 around the roller 13, the guided movement of the cage 12 is half as great as the movement of the table plate 8. With this arrangement, therefore, the guiding surfaces 3, 4 and 6, 7 are so related to the diameter of the balls 5 that the balls with the existing rolling radius undergo half the table movement on advance of the table plate. The guided extent of the cage 12 hence corresponds to the movement of the travel of the balls, so that a forced movement of the balls is prevented. The cage 12 is thus always, i.e. even with small advances, held in such position that a forced return movement of the cage with rubbing or sliding of the balls on the guiding surfaces is safely avoided.

In the embodiment according to Figs. 3 and 4, a ball cage 18 is horizontally mounted between a support plate 19 and a table plate 20. In this embodiment, the table plate 20 merely has one running surface 21, whereas similar prism-shaped surfaces 22, 23 are provided in the support plate in order to provide the necessary rolling radius in relation to the constrained guiding provided, so that the guided extent of the cage 18 is equal to the distance travelled by the balls. In the embodiment according to Figs. 3 and 4, a cable roller 24 is also mounted at the end of the cage 18. A cable 26 is guided over this and is secured at one end to the end of the support plate, for example, by means of a nut 25 and at the other end to the end of the table plate 20. The securement to the table plate 20 is effected in this embodiment by means of a nut 27, so that fine setting is facilitated. The cable 26 is guided in front of the nut 27 round a curved surface 28.

In a preferred embodiment, the cable rollers 13, 24 and cables guides 14, 26 are provided at each end of a cage, so that constrained guiding of the cage is ensured in either direction of movement. There is also the possibility of providing only one such cable guide at one end of the cage and, for example, as schematically shown in Fig. 1, an extensible force storer such as a spring 30 may be arranged at the other end of the cage 12 between the cage and an abutment 32 on the support plate 1. The spring 30 is so arranged that it is tensioned when the cage has been moved by the cable guide to the end of its guide at which the cable guide is located. The return movement of the cage is then effected by the spring 30.

What I claim is:

1. In a machine tool having a movable member movably supported on a relatively fixed member parallel guide surfaces formed on said members and roller bearing bodies engaging said guide surfaces interposed between said members, a cage housing said roller bearing bodies, pulley means mounted on said cage and a flexible cable means affixed at one point to said movable member and said fixed member at another point, both of said points being on a common side of said pulley means said cable means passing over said pulley means intermediate said points whereby movement of said movable member a given distance in a given direction translates said cage one half of said given distance in a like direction.

2. In a machine tool as in claim 1 wherein a second pulley means is affixed to said cage engaged by a second cable means affixed to said members in a like manner whereby reversing the given direction of movement of said movable member reverses the direction of movement of said cage.

3. In a machine tool as in claim 1 wherein spring means are affixed to one end of said cage and cooperates with said fixed member wherein reversal of said given direction of movement of said movable member causes said cage to move in said reverse direction.

References Cited in the file of this patent

UNITED STATES PATENTS

| | | |
|---|---|---|
| 1,201,791 | Anderson | Oct. 17, 1916 |
| 1,466,122 | English | Aug. 28, 1923 |
| 1,483,330 | Broman | Feb. 12, 1924 |
| 1,567,548 | Stebbins | Dec. 29, 1925 |
| 2,400,374 | Selnes | May 14, 1946 |
| 2,418,639 | Horman | Apr. 8, 1947 |
| 2,607,636 | Michelsen | Aug. 19, 1952 |
| 2,866,505 | Forkner | Dec. 30, 1958 |